(12) United States Patent
Reynolds

(10) Patent No.: US 10,461,783 B2
(45) Date of Patent: Oct. 29, 2019

(54) RADIO FREQUENCY COMMUNICATION DEVICES HAVING BACKSCATTER AND NON-BACKSCATTER COMMUNICATION MODES AND HARDWARE RE-USE

(71) Applicant: University of Washington, Seattle, WA (US)

(72) Inventor: Matthew S. Reynolds, Seattle, WA (US)

(73) Assignee: University of Washington, Seattle, WA (US)

( * ) Notice: Subject to any disclaimer, the term of this patent is extended or adjusted under 35 U.S.C. 154(b) by 0 days.

(21) Appl. No.: 15/923,238

(22) Filed: Mar. 16, 2018

(65) Prior Publication Data

US 2018/0269909 A1    Sep. 20, 2018

Related U.S. Application Data

(60) Provisional application No. 62/472,381, filed on Mar. 16, 2017.

(51) Int. Cl.
*H04B 1/04* (2006.01)
*H04B 1/403* (2015.01)
(Continued)

(52) U.S. Cl.
CPC ............... *H04B 1/04* (2013.01); *H04B 1/406* (2013.01); *H04B 5/00* (2013.01); *H04B 5/0031* (2013.01); *H04W 88/06* (2013.01)

(58) Field of Classification Search
CPC . H04B 1/04; H04B 5/00; H04B 1/406; H04B 5/0031; H04W 88/06
(Continued)

(56) References Cited

U.S. PATENT DOCUMENTS 4,298,280 A   11/1981   Harney
4,916,460 A    4/1990   Powell
(Continued)

FOREIGN PATENT DOCUMENTS

EP        2976734        1/2016
WO     2014153516 A1    9/2014
(Continued)

OTHER PUBLICATIONS

US 10,187,177 B2, 01/2019, Gollakota et al. (withdrawn)
(Continued)

*Primary Examiner* — Eugene Yun
(74) *Attorney, Agent, or Firm* — Dorsey & Whitney LLP

(57) ABSTRACT

Backscatter communication offers the potential for significant energy savings compared to conventional wireless links such as Bluetooth, Zigbee, WiFi, etc. However, backscatter communication requires the presence of a carrier source in the environment at an appropriate frequency. If such a carrier source is not available in the environment, backscatter communication may not be practical. Examples are presented for a radio frequency communication device having the option to use either backscatter communication, or non-backscatter communication, with the re-use of at least portions of the hardware components between the backscatter and non-backscatter communication modes.

19 Claims, 7 Drawing Sheets

(51) Int. Cl.
*H04B 5/00* (2006.01)
*H04W 88/06* (2009.01)

(58) Field of Classification Search
USPC .......................................................... 455/91
See application file for complete search history.

(56) References Cited

U.S. PATENT DOCUMENTS

| | | | |
|---|---|---|---|
| 5,220,330 | A | 6/1993 | Salvail et al. |
| 5,321,599 | A | 6/1994 | Tanamachi et al. |
| 5,649,296 | A | 7/1997 | Maclellan et al. |
| 5,663,710 | A | 9/1997 | Fasig et al. |
| 5,784,686 | A | 7/1998 | Wu et al. |
| 5,995,040 | A | 11/1999 | Issler et al. |
| 6,084,530 | A | 7/2000 | Pidwerbetsky et al. |
| 6,094,450 | A | 7/2000 | Shockey |
| 6,243,012 | B1 | 6/2001 | Shober et al. |
| 6,259,408 | B1 | 7/2001 | Brady et al. |
| 6,297,696 | B1 | 10/2001 | Abdollahian et al. |
| 6,611,224 | B1 | 8/2003 | Nysen et al. |
| 6,745,008 | B1 | 6/2004 | Carrender et al. |
| 6,765,476 | B2 | 7/2004 | Steele et al. |
| 6,838,989 | B1* | 1/2005 | Mays ............... G06K 19/0723 340/572.1 |
| 6,870,460 | B2 | 3/2005 | Turner et al. |
| 6,970,089 | B2 | 11/2005 | Carrender |
| 7,180,402 | B2 | 2/2007 | Carrender et al. |
| 7,215,976 | B2 | 5/2007 | Brideglall |
| 7,358,848 | B2 | 4/2008 | Mohamadi |
| 7,469,013 | B1 | 12/2008 | Bolt et al. |
| 7,535,360 | B2 | 5/2009 | Barink et al. |
| 7,796,016 | B2 | 9/2010 | Fukuda |
| 7,839,283 | B2 | 11/2010 | Mohamadi et al. |
| 7,961,093 | B2 | 6/2011 | Chiao et al. |
| 7,995,685 | B2 | 8/2011 | Wang et al. |
| 8,026,839 | B2 | 9/2011 | Weber |
| 8,120,465 | B2 | 2/2012 | Drucker |
| 8,170,485 | B2 | 5/2012 | Hulvey |
| 8,284,032 | B2 | 10/2012 | Lee et al. |
| 8,391,824 | B2 | 3/2013 | Kawaguchi |
| 8,526,349 | B2 | 9/2013 | Fisher |
| 8,797,146 | B2 | 8/2014 | Cook et al. |
| 8,952,789 | B2 | 2/2015 | Dardari |
| 8,971,704 | B2 | 3/2015 | Cavaliere et al. |
| 9,312,950 | B1 | 4/2016 | Deyle |
| 9,357,341 | B2 | 5/2016 | Deyle |
| 9,680,520 | B2 | 6/2017 | Gollakota et al. |
| 9,973,367 | B2 | 5/2018 | Gollakota et al. |
| 10,033,424 | B2 | 7/2018 | Gollakota et al. |
| 10,079,616 | B2 | 9/2018 | Reynolds et al. |
| 2002/0015436 | A1 | 2/2002 | Ovard et al. |
| 2003/0043949 | A1 | 3/2003 | O'Toole et al. |
| 2003/0133495 | A1 | 7/2003 | Lerner et al. |
| 2003/0174672 | A1 | 9/2003 | Herrmann |
| 2004/0005863 | A1 | 1/2004 | Carrender |
| 2004/0210611 | A1 | 10/2004 | Gradishar et al. |
| 2005/0053024 | A1 | 3/2005 | Friedrich |
| 2005/0099269 | A1 | 5/2005 | Diorio et al. |
| 2005/0201450 | A1 | 9/2005 | Volpi et al. |
| 2005/0248438 | A1* | 11/2005 | Hughes ............ G06K 19/0717 340/10.4 |
| 2005/0265300 | A1 | 12/2005 | Rensburg |
| 2006/0044147 | A1 | 3/2006 | Knox et al. |
| 2006/0045219 | A1 | 3/2006 | Wang et al. |
| 2006/0082458 | A1 | 4/2006 | Shanks et al. |
| 2006/0087406 | A1 | 4/2006 | Willins et al. |
| 2006/0109127 | A1 | 5/2006 | Barink et al. |
| 2006/0220794 | A1 | 10/2006 | Zhu |
| 2006/0236203 | A1 | 10/2006 | Diorio et al. |
| 2006/0261952 | A1 | 11/2006 | Kavounas et al. |
| 2007/0018904 | A1 | 1/2007 | Smith |
| 2007/0046434 | A1 | 3/2007 | Chakraborty |
| 2007/0069864 | A1 | 3/2007 | Bae et al. |
| 2007/0096876 | A1 | 5/2007 | Bridgelall et al. |
| 2007/0109121 | A1 | 5/2007 | Cohen |
| 2007/0111676 | A1 | 5/2007 | Trachewsky et al. |
| 2007/0115950 | A1 | 5/2007 | Karaoguz et al. |
| 2007/0201786 | A1 | 8/2007 | Wuilpart |
| 2007/0210923 | A1 | 9/2007 | Butler et al. |
| 2007/0285245 | A1 | 12/2007 | Djuric et al. |
| 2007/0293163 | A1 | 12/2007 | Kilpatrick |
| 2008/0131133 | A1 | 6/2008 | Blunt et al. |
| 2008/0136646 | A1 | 6/2008 | Friedrich |
| 2008/0165007 | A1 | 7/2008 | Drago et al. |
| 2008/0180253 | A1 | 7/2008 | Ovard et al. |
| 2008/0207357 | A1 | 8/2008 | Savarese et al. |
| 2008/0211636 | A1 | 9/2008 | O'Toole et al. |
| 2008/0225932 | A1 | 9/2008 | Fukuda |
| 2008/0252442 | A1 | 10/2008 | Mohamadi et al. |
| 2009/0201134 | A1 | 8/2009 | Rofougaran |
| 2009/0243804 | A1 | 10/2009 | Fukuda |
| 2010/0156651 | A1 | 6/2010 | Broer |
| 2010/0271188 | A1 | 10/2010 | Nysen |
| 2011/0053178 | A1 | 3/2011 | Yang |
| 2011/0260839 | A1 | 10/2011 | Cook et al. |
| 2012/0001732 | A1 | 1/2012 | Kawaguchi |
| 2012/0002766 | A1 | 1/2012 | Kawaguchi |
| 2012/0051411 | A1 | 3/2012 | Duron et al. |
| 2012/0112885 | A1 | 5/2012 | Drucker |
| 2012/0245444 | A1 | 9/2012 | Otis et al. |
| 2012/0311072 | A1 | 12/2012 | Huang et al. |
| 2012/0313698 | A1 | 12/2012 | Ochoa et al. |
| 2013/0028305 | A1 | 1/2013 | Gollakota et al. |
| 2013/0028598 | A1 | 1/2013 | Cavaliere et al. |
| 2013/0069767 | A1 | 3/2013 | Ovard et al. |
| 2013/0176115 | A1 | 7/2013 | Puleston et al. |
| 2013/0215979 | A1 | 8/2013 | Yakovlev et al. |
| 2013/0223270 | A1 | 8/2013 | Cheng |
| 2013/0265140 | A1 | 10/2013 | Gudan et al. |
| 2013/0286959 | A1 | 10/2013 | Lou et al. |
| 2013/0322498 | A1 | 12/2013 | Maquire |
| 2014/0016719 | A1 | 1/2014 | Manku |
| 2014/0044233 | A1 | 2/2014 | Morton |
| 2014/0113561 | A1 | 4/2014 | Maguire |
| 2014/0313071 | A1 | 10/2014 | Mccorkle |
| 2014/0364733 | A1 | 12/2014 | Huang et al. |
| 2015/0108210 | A1 | 4/2015 | Zhou |
| 2015/0311944 | A1 | 10/2015 | Gollakota et al. |
| 2015/0381269 | A1 | 12/2015 | Deyle |
| 2016/0094933 | A1 | 3/2016 | Deyle |
| 2016/0266245 | A1 | 9/2016 | Bharadia et al. |
| 2016/0365890 | A1 | 12/2016 | Reynolds et al. |
| 2017/0180075 | A1 | 6/2017 | Gollakota et al. |
| 2017/0180178 | A1 | 6/2017 | Gollakota et al. |
| 2017/0180703 | A1 | 6/2017 | Kovacovsky et al. |
| 2017/0331509 | A1 | 11/2017 | Gollakota et al. |
| 2018/0331865 | A1 | 11/2018 | Ziv et al. |
| 2018/0358996 | A1 | 12/2018 | Gollakota et al. |
| 2018/0375703 | A1 | 12/2018 | Kellogg et al. |
| 2019/0116078 | A1 | 4/2019 | Gollakota et al. |

FOREIGN PATENT DOCUMENTS

| | | |
|---|---|---|
| WO | 2015123306 A1 | 8/2015 |
| WO | 2015123341 A1 | 8/2015 |
| WO | 2016100887 A2 | 6/2016 |
| WO | 2017027847 A1 | 2/2017 |
| WO | 2017132400 A1 | 8/2017 |
| WO | 2017176772 A1 | 10/2017 |
| WO | 2018075653 A1 | 4/2018 |
| WO | 2018187737 A1 | 10/2018 |

OTHER PUBLICATIONS

US 10,187,241 B2, 01/2019, Gollakota et al. (withdrawn)
Cadence, "Cadence Spectre RF Option", http://www.cadence.com/products/rf/spectre_rf_simulation/pages/default.aspx. (Retrieved Jul. 19, 2018).
DigiPoints. DigiPoints Series vol. 1 Leader Guide Module 9—Network Architectures. Sep. 18, 2015, pp. 9.i-9.18.
IEEE, "IEEE Standard for Ethernet", http://standards.ieee.org/getieee802/download/802.11-2012.pdf., Dec. 28, 2012.

(56) References Cited

OTHER PUBLICATIONS

Maxim Integrated, "2.4GHz to 2.5GHz 802.11 g/b FR Transceiver, PA, and Rx/Tx/Antenna Diversity Switch", https://datasheets.maximintegrated.com/en/ds/MAX2830.pdf. (Retrieved Jul. 19, 2018).
Nasa, "A Wi-Fi Reflector Chip to Speed Up Wearables", http://www.jpl.nasa.gov/news/news.php?feature=4663. Jul. 22, 2015.
Qualcomm, "AR9462 Single-chip, 2.4/5GHz, 2-stream 802.11a/b/g/n and BT 4.0+HS SoC Solution with SST Technology", http://www.qca.qualcomm.com/wp-content/uploads/2013/11/AR9462.pdf. (Retrieved Jul. 19, 2018).
Qualcomm. "QCA4002/4004 Qualcomm low-power Wi-Fi", http://www.eeworld.com.cn/zt/wireless/downloads/QCA4002-4004FIN.pdf. (Retrieved Jul. 19, 2018).
Synopsys, "Concurrent Timing, Area, Power and Test Optimization", http://www.synopsys.com/Tools/Implementation/RTLSynthesis/DesignCompiler/Pages/default.aspx. (Retrieved Jul. 19, 2018).
U.S. Appl. No. 15/752,214 entitled 'Backscatter Devices and Network Systems Incorporating Backscatter Devices' filed Feb. 12, 2018, pp. all.
Unknown, "Altera de1 fpga development board", http://www.terasic.com.tw/cgi-bin/page/archive.pl?No=83.(Retrieved Jul. 19, 2018).
Unknown, "Analog Devices HMC190BMS8/190BMS8E", https://www.hittite.com/content/documents/data_sheet/hmc190bms8.pdf. (Retrieved Jul. 19, 2018).
Unknown, "Nest Cam Indoor", https://nest.com/camera/meet-nest-cam/?dropcam=true. 2018. (Retrieved Jul. 19, 2018).
"Advanced Television Systems Committee (ATSC) (Sep. 1995) "ATSC Digital Television Standard," ATSC Doc. A/53, 74 pages", Sep. 1995.
"Analog Devices (retrieved Apr. 2016) "ADG919 RF Switch Datasheet," available online at: http://www.datasheet-pdf.com/PDF/ADG919-Datasheet-AnalogDevices-140819", Apr. 2016.
"Analog Devices, Inc. (retrieved Jan. 2016) "ADG902 RF switch datasheet," available online at: http://www.analog.com/static/imported-files/data_sheets/adg901_902.pdf", Jan. 2016.
"Axcera.com (retrieved Jan. 2016) "8VSB vs. COFDM," available online at: http://www.axcera.com/downloads/technotes-whitepapers/technote_4.pdf", Jan. 2016.
"DiBEG (May 2014; retrieved Jan. 2016) "The Launching Country," available online at: http://www.dibeg.org/world/world.html", May 2014.
"E. Inc. (retrieved Apr. 2016) "Universal software radio peripheral," available online at: http://ettus.com", Apr. 2016.
"Encounternet (retrieved Jan. 2016) "The Encounternet Project," available online at: http://encounternet.net/", Jan. 2016.
"Federal Communications Commission (retrieved Jan. 2016) "41 dBu service contours around ASRN 1226015, FCC TV query database," available online at: http://transition.fcc.gov/fcc-bin/tvq?list=0&facid=69571", Jan. 2016.
"STMicroelectronics (Jul. 2012) "TS 881 Datasheet," 1 page", Jul. 2012.
Anthony,, Sebastian , ""Free energy harvesting from TV signals, to power a ubiquitous internet of things"", ExtremeTech, google search, Jul. 8, 2013, 8 pages, Jul. 8, 2013.
Bharadia, et al., "Backfi: High Throughput WiFi Backscatter". In Proceedings of the 2015 ACM Conference on Special Interest Group on Data Communication, Aug. 2015.
Bharadia, et al., ""Full duplex backscatter"", Proceedings of the 12th ACM Workshop on Hot Topics in Networks, Article No. 4, pp. 1-7, Nov. 2013.
Bharadia, et al., ""Full duplex radios"", Proceedings of the ACM SIGCOMM 2013 (SIGCOMM '13), pp. 375-386, Aug. 2013.
Bohorquez, et al., ""A 350µW CMOS MSK transmitter and 400µW OOK super-regenerative receiver for medical implant communications"", IEEE Journal of Solid-State Circuits, 44(4):1248-1259, Apr. 2009.
Buettner, , ""Backscatter Protocols and Energy-Efficient Computing for RF-Powered Devices"", PhD Thesis, University of Washington, Seattle, WA, 144 pages, Retrieved Jan. 2016., 2012.

Buettner, et al., ""Dewdrop: An energy-aware runtime for computational RFID"", Proceedings of the 8th USENIX Conference on Networked Systems Design and Implementation (NSDI'11), pp. 197-210, Mar. 2011.
Buettner, et al., ""RFID Sensor Networks with the Intel WISP"", Proceedings of the 6th ACM Conference on Embedded Network Sensor Systems (SenSys '08), pp. 393-394, Nov. 2008.
Chen, et al., Denis Guangyin Chen et al, "Pulse-Modulation Imaging—Review and Performance Analysis", IEEE Transactions on Biomedical Circuits and Systems, vol. 5, No. 1, Feb. 2011, at 64.
Chokshi, et al., "Yes! Wi-Fi and Bluetooth Can Coexist in Handheld Devices", Emerging and Embedded Business Unit, Marvell Semiconductor, Inc., Mar. 2010.
Dayhoff, , ""New Policies for Part 15 Devices"", Federal Communications Commission (FCC) Telecommunications Certification Body Council (TCBC) Workshop 2005, 13 pages, May 2005.
Dementyev, et al., ""Wirelessly Powered Bistable Display Tags"", ACM International Joint Conference on Pervasive and Ubiquitous Computing (UbiComp '13), pp. 383-386, Sep. 2013.
Dementyev, A. et al., ""A Wearable UHF RFID-Based EEG System"", 2013 IEEE International Conference on RFID (RFID), pp. 1-7, Apr.-May 2013.
Duarte, et al., ""Full-duplex wireless communications using off-the-shelf radios: Feasibility and first results"", 2010 Conference Record of the 44th Asilomar Conference on Signals, Systems and Computers (ASILOMAR), pp. 1558-1562, Nov. 2010.
Duarte, , ""Full-duplex Wireless: Design, Implementation and Characterization"", Ph.D. thesis, Rice University, 70 pages, Apr. 2012.
Duc, et al., "Enhancing Security of EPCGlobal Gen-2 RFID against Traceability and Cloning", Auto-ID Labs Information and Communication University, Auto-ID Labs White Paper No. WP-SWNET-016, 11 pages, Retrieved Jan. 2016, 2006 copyright.
Elliott, , ""Average U.S. Home Now Receives a Record 118.6 TV Channels, According to Nielsen"", available online at: http://www.nielsen.com/us/en/insights/pressroom/2008/average_u_s_home.html, Jun. 2008.
Ensworth, et al., "Every smart phone is a backscatter reader: Modulated backscatter compatibility with bluetooth 4.0 low energy (ble) devices". 2015 IEEE International Conference on RFID. (Retrieved Jul. 19, 2018).
Gorlatova, et al., ""Energy harvesting active networked tags (EnHANTs) for ubiquitous object networking"", IEEE Wireless Communications, 17(6):18-25, Dec. 2010.
Greene, et al., "Intel's Tiny Wi-Fi Chip Could Have a Big Impact". MIT Technology review, Sep. 21, 2012.
Guo, et al., ""Virtual full-duplex wireless communication via rapid on-off-division duplex"", 48th Annual Allerton Conference on Communication, Control, and Computing (Allerton), pp. 412-419, Sep.-Oct. 2010.
Jain, et al., ""Practical, real-time, full duplex wireless"", Proceedings of the 17th Annual International Conference on Mobile Computing and Networking (MobiCom'11), pp. 301-312, Sep. 2011.
Javed, et al., Sajid Javed et al, Background Subtraction via Superpixel-Based Online Matrix Decomposition With Structured Foreground Constraints, ICCVW '15 Proceedings of the 2015 IEEE International Conference on Computer Vision Workshop, Dec. 2015.
Johnston, Scott , "Software Defined Radio Hardware Survey", Oct. 2011, 31 pgs.
Kellogg, et al., ""Bringing gesture recognition to all devices"", Proceedings of the 11th USENIX Conference on Network Systems Design and Implementation (NSDI'14), pp. 303-316, Apr. 2014.
Kellogg, et al., "Wi-Fi Backscatter: Internet Connectivity for RF-Powered Devices", University of Washington, SIGCOMM'14, Aug. 17-22, 2014.
Khannur, et al., "A Universal UHF RFID reader IC in 0.18-µm CMOS Technology". Solid-State Circuits, IEEE Journal of, 43(5):1146-1155, May 2008.
Kim, et al., ""Flush: a reliable bulk transport protocol for multihop wireless networks"", Proceedings of the 5th International Conference on Embedded Networked Sensor Systems (SenSys '07), pp. 351-365, Nov. 2007.

(56) References Cited

OTHER PUBLICATIONS

Kleinrock, et al., ""Packet Switching in Radio Channels: Part I—Carrier Sense Multiple-Access Modes and Their Throughput-Delay Characteristics"", IEEE Transactions on Communications, 23(12):1400-1416, Dec. 1975.
Kodialam, et al., ""Fast and reliable estimation schemes in RFID systems"", Proceedings of the 12th Annual International Conference on Mobile Computing and Networking (MobiCom '06), pp. 322-333, Sep. 2006.
Koomey, JG et al., ""Implications of Historical Trends in the Electrical Efficiency of Computing"", IEEE Annals of the History of Computing, 33(3):46-54, Aug. 2011.
Kuester, et al., ""Baseband Signals and Power in Load-Modulated Digital Backscatter," IEEE Antenna and Wireless Propagation Letter, vol. II, 2012, pp. 1374-1377, Nov. 2012."
Lazarus, , ""Remote, wireless, ambulatory monitoring of implantable pacemakers, cardioverter defibrillators, and cardiac resynchronization therapy systems: analysis of a worldwide database"", Pacing and Clinical Electrophysiology, 30(Suppl 1):S2-S12, Jan. 2007.
Liang, et al., ""Surviving wi-fi interference in low power zigbee networks"", Proceedings of the 8th ACM Conference on Embedded Networked Sensor Systems (SenSys '10), pp. 309-322, Nov. 2010.
Liu, et al., ""Ambient Backscatter: Wireless Communication out of Thin Air"", Proceedings of the Association for Computing Machinery (ACM) 2013 Conference on Special Interest Group on Data Communications (SIGCOMM), pp. 39-50, also in ACM SIGCOMM Communication Review, 43(4):39-50, Aug./Oct. 2013.
Liu, et al., ""Digital Correlation Demodulator Design for RFID Reader Receiver"", IEEE Wireless Communications and Networking Conference (WCNC 2007), pp. 1666-1670, Mar. 2007.
Liu, et al., ""Enabling Instantaneous Feedback with Full-duplex Backscatter"", Proceedings of the 20th Annual International Conference on Mobile Computing and Networking (MobiCom'14), pp. 67-78, Sep. 2014.
Lu, et al., "Enfold: Downclocking OFDM in WiFi". In Proceedings of the 20th annual international conference on Mobile computing and networking, pp. 129-140. ACM, Sep. 2014.
Lu, et al., "Slomo: Downclocking WiFi Communication". In NSDI, pp. 255-258, Apr. 2013.
Mace, , ""Wave reflection and transmission in beams"", Journal of Sound and Vibration, 97(2):237-246, Nov. 1984.
Manweiler, et al., "Avoiding the Rush Hours: Wifi Energy Management via Traffic Isolation". In MobiSys, Jul. 2011.
Mastrototaro, , ""The MiniMed Continuous Glucose Monitoring System"", Diabetes Technology & Therapeutics, 2(Suppl 1):13-18, Dec. 2000.
Merritt, , "Atheros targets cellphone with Wi-Fi chip", EE Times (Nov. 2, 2009), http://www.eetimes.com/document.asp?doc_id=1172134.
Metcalfe, et al., ""Ethernet: Distributed packet switching for local computer networks"", Communications of the ACM, 19(7):395-404, Jul. 1976.
Mishra, et al., ""Supporting continuous mobility through multi-rate wireless packetization"", Proceedings of the 9th Workshop on Mobile Computing Systems and Applications (HotMobile '08), pp. 33-37, Feb. 2008.
Mittal, et al., "Empowering developers to estimate app energy consumption". In MobiCom, Aug. 2012.
Murray Associates, , "The Great Seal Bug Part 1", Murray Associates, Mar. 2017.
Mutti, et al., ""CDMA-based RFID Systems in Dense Scenarios: Concepts and Challenges"", 2008 IEEE International Conference on RFID, pp. 215-222, Apr. 2008.
Naderiparizi, et al., Saman Naderiparizi etal, "Ultra-Low-Power Wireless Streaming Cameras", arXiv:1707.08718v1, Jul. 27, 2017, Cornell University Library.
Navaneethan, et al., Navaneethan, VM. Security Enhancement of Frequency Hopping Spread Spectrum Based on Oqpsk Technique. IOSR Journal of Electronics and Communication Engineering. May 2016. 62.

Nikitin, et al., ""Passive tag-to-tag communication"", 2012 IEEE International Conference on RFID (RFID), pp. 177-184, Apr. 2012.
Nikitin, et al., ""Theory and measurement of backscattering from RFID tags"", IEEE Antennas and Propagation Magazine, 48(6):212-218, Dec. 2006.
Obeid, et al., ""Evaluation of spike-detection algorithms for a brain-machine interface application"", IEEE Transactions on Biomedical Engineering, 51(6):905-911, Jun. 2004.
Occhiuzzi, et al., ""Modeling, Design and Experimentation of Wearable RFID Sensor Tag"", IEEE Transactions on Antennas and Propagation, 58(8):2490-2498, Aug. 2010.
Pandey, et al., ""A Sub-100 µ W MICS/ISM Band Transmitter Based on Injection-Locking and Frequency Multiplication"", IEEE Journal of Solid-State Circuits, 46(5):1049-1058, May 2011.
Parks, et al., ""A wireless sensing platform utilizing ambient RF energy"", 2013 IEEE Topical Conference on Biomedical Wireless Technologies, Networks, and Sensing Systems (BioWireleSS), pp. 154-156, Jan. 2013.
Parks, Aaron N. et al., "Turbocharging Ambient Backscatter Communication", SIGCOMM, Aug. 2014, 1-12.
Pillai, et al., ""An Ultra-Low-Power Long Range Battery/Passive RFID Tag for UHF and Microwave Bands With a Current Consumption of 700 nA at 1.5 V"", IEEE Transactions on Circuits and Systems I: Regular Papers, 54(7):1500-1512, Jul. 2007.
Proakis, et al., "Digital communications". 2005. McGraw-Hill, New York. (Retrieved Jul. 19, 2018).
Qing, et al., ""A folded dipole antenna for RFID"", IEEE Antennas and Propagation Society International Symposium, 1:97-100, Jun. 2004.
Rabaey, et al., ""PicoRadios for wireless sensor networks: the next challenge in ultra-low power design"", 2002 IEEE International Solid-State Circuits Conference, Digest of Technical Papers (ISSCC), 1:200-201, Feb. 2002.
Ransford, et al., ""Mementos: system support for long-running computation on RFID-scale devices"", ACM SIGPLAN Notices—Proceedings of the 16th International Conference on Architecturla Support for Programming Languages and Operating Systems (ASPLOS '11), 46(3):159-170, Mar. 2011.
Rao, KVS et al., ""Antenna design for UHF RFID tags: a review and a practical application"", IEEE Transactions on Antennas and Propagation, 53(12):3870-3876, Dec. 2005.
Rattner, et al., "Connecting the Future: It's a Wireless World", Sep. 2013.
Roy, et al., ""RFID: From Supply Chains to Sensor Nets"", Proceedings of the IEEE, 98(9):1583-1592, Jul. 2010.
Sample, et al., ""Design of an RFID-Based Battery-Free Programmable Sensing Platform"", IEEE Transactions on Instrumentation and Measurement, 57(11):2608-2615, Nov. 2008.
Sample, et al., ""Experimental results with two wireless power transfer systems"", IEEE Radio and Wireless Symposium (RAWCON), pp. 16-18, Jan. 2009.
Seigneuret, et al., ""Auto-tuning in passive UHF RFID tags"", 2010 8th IEEE International NEWCAS Conference (NEWCAS), pp. 181-184, Jun. 2010.
Sen, et al., ""CSMA/CN: Carrier sense multiple access with collision notification"", Proceedings of the 16th Annual International Conference on Mobile Computing and Networking (MobiCom'10), pp. 25-36, Sep. 2010.
Smith, JR et al., ""A wirelessly-powered platform for sensing and computation"", ACM International Joint Conference on Pervasive and Ubiquitous Computing (UbiComp 2006), 4206:495-506, Sep. 2006.
So, et al., ""Multi-channel mac for ad hoc networks; handling multi-channel hidden terminals using a single transceiver"", Proceedings of the 5th ACM International Symposium on Mobile Ad Hoc Networking and Computing, pp. 222-233, May 2004.
Srinivasan, et al., ""An empirical study of low-power wireless"", ACM Transactions on Sensor Networks (TOSN), vol. 6, Issue 2, Article No. 16, Feb. 2010.
Thomas, et al., ""A 96 Mbit/sec, 15.5 pJ/bit 16-QAM modulator for UHF backscatter communication"", 2012 IEEE International Conference on RFID (RFID), IEEE RFID Virtual Journal, pp. 185-190, Apr. 2012.

(56) References Cited

OTHER PUBLICATIONS

Tubaishat, et al., ""Sensor networks: an overview"", IEEE Potentials, 22(2):20-23, Apr.-May 2003.

Walden, , ""Analog-to-digital converter survey and analysis"", IEEE Journal on Selected Areas in Communications, 17(4):539-550, Apr. 1999.

Welbourne, et al., ""Building the Internet of Things Using RFID: The RFID Ecosystem Experience"", IEEE Internet Computing, 13(3):48-55, May-Jun. 2009.

Wuu, et al., ""Zero-Collision RFID Tags Identification Based on CDMA"", 5th International Conference on Information Assurance and Security (IAS '09), pp. 513-516, Aug. 2009.

Yi, et al., ""Analysis and Design Strategy of UHF Micro-Power CMOS Rectifiers for Micro-Sensor and RFID Applications"", IEEE Transactions on Circuits and Systems I: Regular Papers, 54(1):153-166, Jan. 2007.

Ying, et al., "A System Design for UHF RFID Reader". In Communication Technology, 2008. ICCT 2008. 11th IEEE International Conference on, pp. 301-304. IEEE, Nov. 2008.

Zalesky, et al., ""Integrating segmented electronic paper displays into consumer electronic devices"", 2011 IEEE International Conference on Consumer Electronics (ICCE), pp. 531-532, Jan. 2011.

Zhang, et al., ""Frame retransmissions considered harmful: improving spectrum efficiency using micro-ACKs"", Proceedings of the 18th Annual International Conference on Mobile Computing and Networking (MobiCom '12), pp. 89-100, Aug. 2012.

Zhang, et al., "EkhoNet: High Speed Ultra Low-power Backscatter for Next Generation Sensors", School of Computer Science, University of Massachusetts, Amherst, MA 01003, Sep. 2014.

U.S. Appl. No. 16/343,088 titled "Backscatter Systems, Devices, and Techniques Utilizing CSS Modulation and/or Higher Order Harmonic Cancellation" filed Apr. 18, 2019.

\* cited by examiner

RADIO FREQUENCY COMMUNICATION DEVICES HAVING BACKSCATTER AND NON-BACKSCATTER COMMUNICATION MODES AND HARDWARE RE-USE

CROSS-REFERENCE TO RELATED APPLICATION(S)

This application claims the benefit under 35 U.S.C. § 119 of the earlier filing date of U.S. Provisional Application Ser. No. 62/472,381 filed Mar. 16, 2017, the entire contents of which are hereby incorporated by reference in their entirety for any purpose.

TECHNICAL FIELD

Examples described herein relate to backscatter communication systems and methods. Examples are described which include radio frequency communication devices having both backscatter and non-backscatter communication modes, and the re-use of the same hardware components to generate both backscatter and non-backscatter communication signals.

BACKGROUND

Backscatter communication offers the potential for significant energy savings compared to conventional wireless links such as Bluetooth, Zigbee, WiFi, etc. However, backscatter communication requires the presence of a carrier source in the environment at an appropriate frequency. If such a carrier source is not available in the environment, backscatter communication may not be practical. It is thus desirable to provide a radio frequency communication device with the option to use either backscatter communication, or non-backscatter communication. Such a device could take advantage of the significant energy savings of backscatter communication when a carrier source is available in the environment, while still retaining the ability to communicate when no carrier source is available in the environment.

SUMMARY

Examples of radio frequency communication devices are described herein. An example radio frequency communication device may include a backscatter transmitter circuit, a non-backscatter transmitter circuit, and an antenna. The backscatter transmitter circuit and the non-backscatter transmitter circuit may be in communication with the antenna. A single antenna may be used for both backscatter and non-backscatter transmission.

In some examples, a backscatter transmitter circuit may include a transistor and the transistor may modulate the impedance presented to the antenna.

In some examples, a bias signal may be applied to a control terminal of the transistor. The control terminal may be a gate terminal of a field effect transistor (FET) or a base terminal of a bipolar junction transistor.

In some examples, the transistor may modulate the impedance presented to the antenna, and that impedance may be controlled by the bias signal, to form a backscatter transmitter. The same transistor may be used as a power amplifier for a non-backscatter transmitter.

In some examples, the transistor may have a drain voltage or a collector voltage of substantially zero volts when the transistor is being used as a backscatter transmitter.

In some examples, the bias signal may be a baseband signal of a communication standard such as the Bluetooth, Wi-Fi, IEEE 802.11, Zigbee, Z-Wave, or LoRa communication standards.

Examples of a method are described herein. An example method may include determining a communication mode for a radio frequency communication device from among a plurality of modes including a backscatter mode and a non-backscatter mode. In such a method, a bias condition for a transistor may be selected depending on whether the radio frequency communication device is in a backscatter or a non-backscatter mode. Such a determination may be based at least in part on the presence or absence of a carrier signal in the environment near the radio frequency communication device.

DETAILED DESCRIPTION

Figure 1:
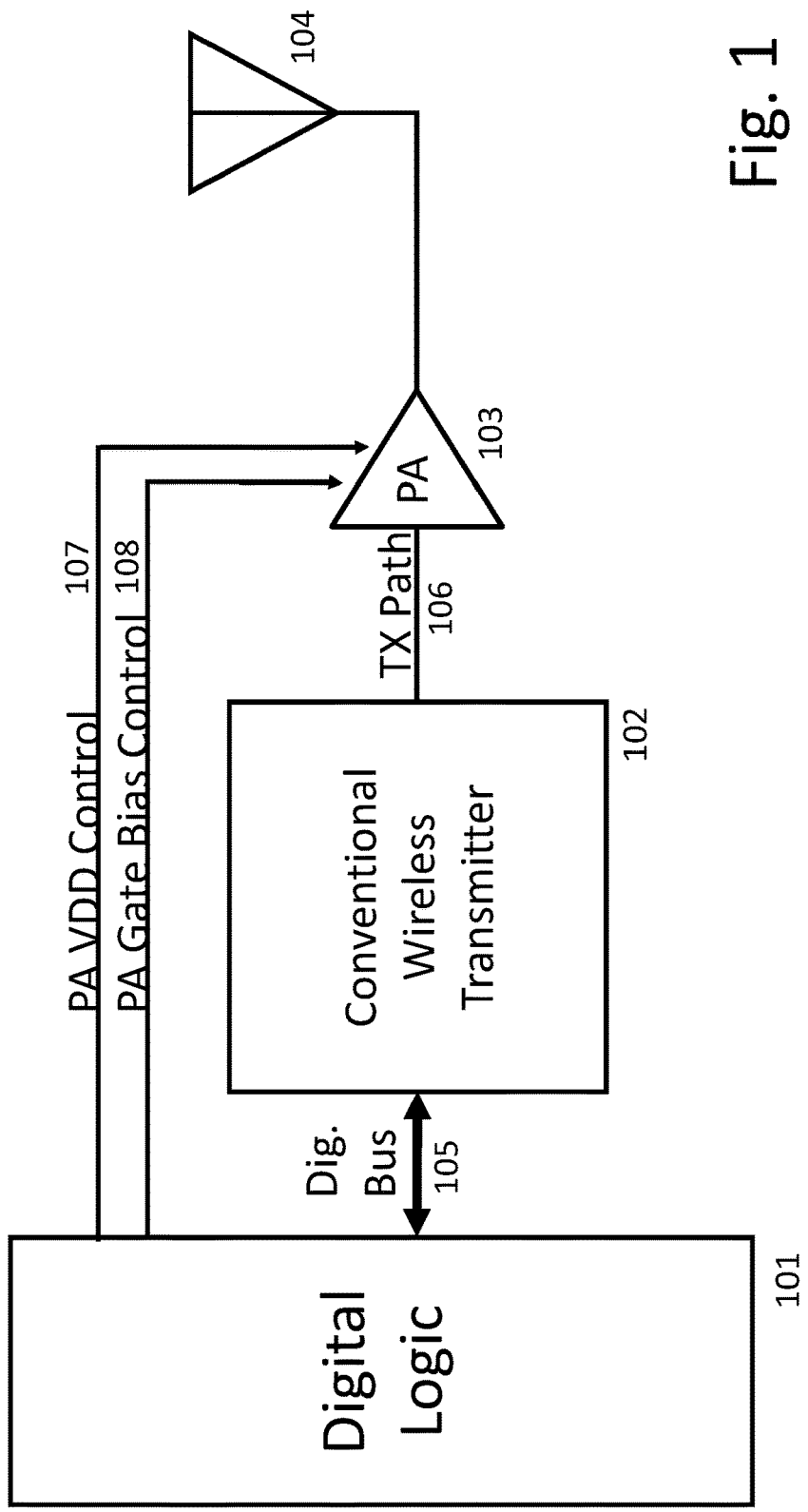
FIG. 1 is a schematic illustration of a radio frequency communication device capable of selectively operating in either backscatter or conventional non-backscatter modes arranged in accordance with examples described herein.

Certain details are set forth below to provide a sufficient understanding of described examples. However, it will be clear to one skilled in the art that examples may be practiced without various of these particular details. In some instances, well-known circuits, control signals, timing protocols, and/or software operations have not been shown in detail in order to avoid unnecessarily obscuring the described examples.

In this description, the phrases "conventional wireless transmitter" and "conventional wireless transceiver" should be understood to refer to a non-backscatter wireless transmitter or transceiver respectively. One feature of a non-backscatter wireless transmitter is that such devices produce their own communication carrier. This is in contrast to backscatter based devices which depend on an externally supplied carrier. Such a non-backscatter wireless transmitter or transceiver may implement one or more wireless communication standards, including but not limited to Bluetooth, Bluetooth Low Energy, Zigbee, Z-Wave, Wi-Fi, IEEE 802.11, IEEE 802.15.4, or LoRa.

In this description, a carrier source may refer to either a modulated or un-modulated radio frequency signal which may serve as a carrier for a backscatter communication system. In some examples, the carrier source may be provided specifically for the purpose of serving as a carrier for a backscatter communication system, while in other examples, the carrier source may be an ambient source such as an AM radio, FM radio, digital television, cellular, land-mobile, satellite, or other signal which may be present in the environment.

It should further be appreciated that backscatter modulation may be accomplished by varying the impedance presented to the terminal(s) of an antenna. As is well known in the state of the art, a varying impedance presented to the terminals of an antenna will cause a change in the reflection by the antenna of a signal incident on the antenna. If the varying impedance is time-varying, a sequence of different reflection states having a different amplitude and/or phase will thus be created. When a signal from a carrier source is incident on an antenna, such a sequence of different reflection states form a sequence of communication symbols. Such symbols may have a one-bit binary representation, if there are two reflection states. Alternatively, if there are more than two reflection states, a multi-bit binary representation may be used to describe the communication symbols. A sequence of communication symbols can be interpreted by a receiver as a multi-bit message that can thus be transmitted from the radio frequency communication device via such a backscatter communication approach.

Some examples include a hybrid architecture for radio frequency communication devices that re-uses the same hardware to selectively operate in either backscatter or conventional (non-backscatter) modes. In one example, a single FET stage is used as both a Class-C power amplifier for a conventional 2.4 GHz, 1 Mbps GFSK Bluetooth Low Energy transmitter with efficiency of approximately 78%, as well as a 10 Mbps BPSK modulator in an ultra-low power backscatter mode. A transmitter energy consumption of 81 nJ/bit is achieved in the conventional mode, while only 32 pJ/bit is required in the BPSK backscatter mode. The data rate of the backscatter mode can be de-coupled from the conventional mode such that the backscatter link can operate at 10× the rate of the conventional link, while achieving over three orders of magnitude power savings. This approach is equally applicable to other communication standards such as WiFi (IEEE 802.11), Zigbee (IEEE 802.15.4), Z-Wave, LoRa, etc.

FIG. 1 shows a diagram of one example of a radio frequency communication device. As shown in FIG. 1, digital logic 101, which may comprise a microprocessor, microcontroller, field programmable gate array (FPGA), complex programmable logic device (CPLD), discrete logic, or integrated logic as e.g. part of an application specific integrated circuit (ASIC), provides a digital bus 105 along with one or more control signals 107, 108.

Digital bus 105 interconnects the digital logic block 101 to a conventional (non-backscatter) wireless transmitter 102, which may be comprised of a single-chip radio frequency transmitter or transceiver (combined transmitter and receiver). In one example, the transceiver may comprise a Nordic Semiconductor nRF24L01+ transceiver chip although others are suitable for this application. Other transmitter implementations such as discrete or multi-chip transmitters are likewise suitable.

The transmitter 102 provides a transmit signal via a transmit path 106 to a power amplifier (PA) 103. In one example, the power amplifier 103 may be comprised of a common source Class-C power amplifier implemented by a field effect transistor (FET) such as an enhancement mode pseudomorphic high electron mobility transistor (e-pHEMT), although other types of transistors such as conventional FETs or bipolar junction transistors (BJTs) are also suitable. In some examples, the power amplifier 103 may be integrated with the aforementioned transmitter 102 on the same semiconductor substrate.

The output of the power amplifier 103 drives an antenna 104 which may comprise any type of antenna known in the art such as a dipole antenna, a whip antenna, a patch antenna, a planar inverted-F antenna (PIFA), etc.

In some examples, one or more control lines 107, 108 may interconnect the digital logic with the power amplifier to control one or more parameters of the power amplifier. In one example, one or more control lines 107 and 108 from the microcontroller may control a drain bias signal VDD and a gate bias signal VG or VGG to a FET based power amplifier (PA) 103 respectively.

The power amplifier block 103 can be used as both a conventional power amplifier for the signal generated by the conventional wireless transmitter as well as a backscatter modulator for backscatter communication. In such examples, the radio frequency communication device may have at least two modes of operation, one mode of operation corresponding to a conventional (non-backscatter) mode, and another mode of operation corresponding to a backscatter mode. Such a system has the advantages of lower complexity and lower cost than other approaches in which the power amplifier block 103 is not re-used between the two modes.

In a conventional (non-backscatter) communication mode, the conventional wireless transmitter 102 may be enabled, for example via a digital control signal conveyed by digital bus 105. One control line 107 may cause the drain bias signal VDD to be set to a power supply voltage such as 3.3V or 5V. A second control line 108 may cause the gate bias signal (VG) to be set to zero volts to enable Class-C operation of the FET PA. In this mode, the FET stage acts as a common source power amplifier to increase the radio frequency power sent to the antenna 104. Using a pHEMT such as the Avago ATF-54143 device, a 2.4 GHz Class C amplifier may have a gain of approximately 10-15 dB and a maximum (compressed) output power of +17 dBm.

In the backscatter modulator mode, in one example, the conventional wireless transmitter may be shut down via a command from the digital logic 101 via the digital bus 105. Alternatively, a "sleep/wake" control line may be provided from the digital logic 101 to the transmitter 102 to shut down the transmitter 102. In this mode, a control line 107 may cause the drain bias VDD of the power amplifier 103 to be set to substantially zero volts. In this mode, the FET PA will not function as an amplifier. Instead, a sequence of digital symbols, which may comprise a baseband signal, having two or more voltage levels are fed from the digital logic 101 to the gate bias VG on the FET via control line 108. In response to the sequence of symbols, the FET modulates its drain to source impedance. This modulation is in turn applied to the antenna 104 to form a backscatter modulation. The backscatter modulation may take the form of an amplitude shift keying (ASK), phase shift keying (PSK), or combinations thereof such as quadrature amplitude modulation (QAM) or orthogonal frequency division multiplexing (OFDM) signals.

In some examples, the sequence of digital symbols may comprise a baseband signal of a communication standard including, but not limited to Bluetooth, Bluetooth Low Energy, Zigbee, Z-Wave, Wi-Fi, IEEE 802.11, IEEE 802.15.4, or LoRa. In such examples, the backscattered signal from the antenna 104 may be compatible with the communication standard, while retaining the power advantages of the backscatter communication modality.

Figure 2:
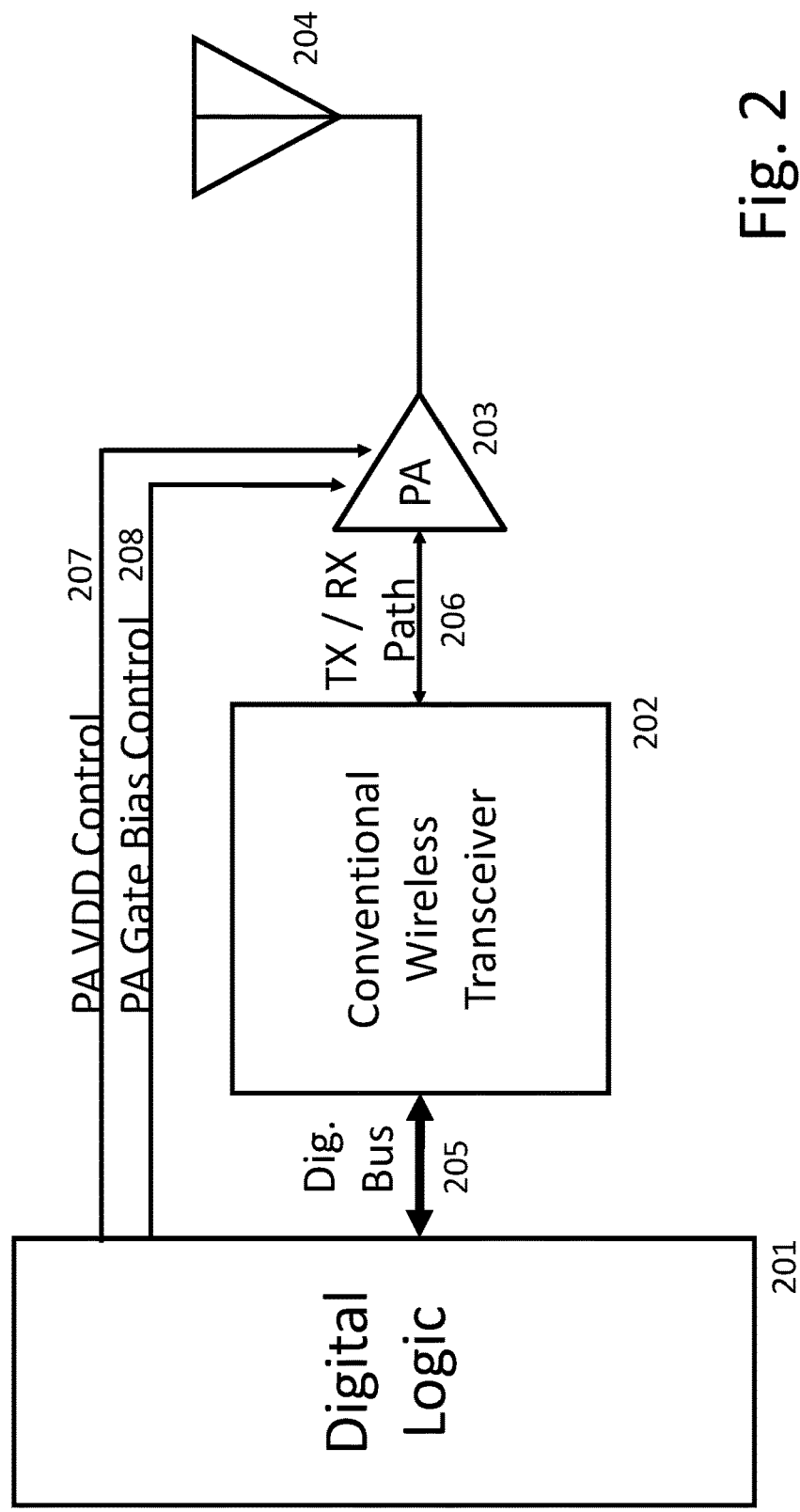
FIG. 2 is a schematic illustration of a radio frequency communication device capable of selectively operating in either backscatter or conventional non-backscatter modes arranged in accordance with examples described herein.

FIG. 2 shows an alternative example wherein the conventional (non-backscatter) wireless transmitter is replaced with a transceiver 202 such as a transceiver integrated circuit (IC). Substantially the same features of the example described in FIG. 1 may be preserved in this example. However, when the PA 203 gate bias and drain bias are both set to zero volts via control signals 207 and 208, the PA transistor may allow a portion of an incident signal from the antenna to couple backwards from e.g. the drain to the gate of the PA transistor via e.g. its Miller capacitance Cgd. A similar property also applies to bipolar junction transistors used as power amplifiers. In this way, the transceiver 202 can receive signals coming into the device from the antenna 204 without the need for a separate transmit-receive switch. The example of FIG. 2 allows operation of the PA 203 as both a conventional power amplifier as well as a backscatter modulator having any of the aforementioned modulation types.

Figure 3:
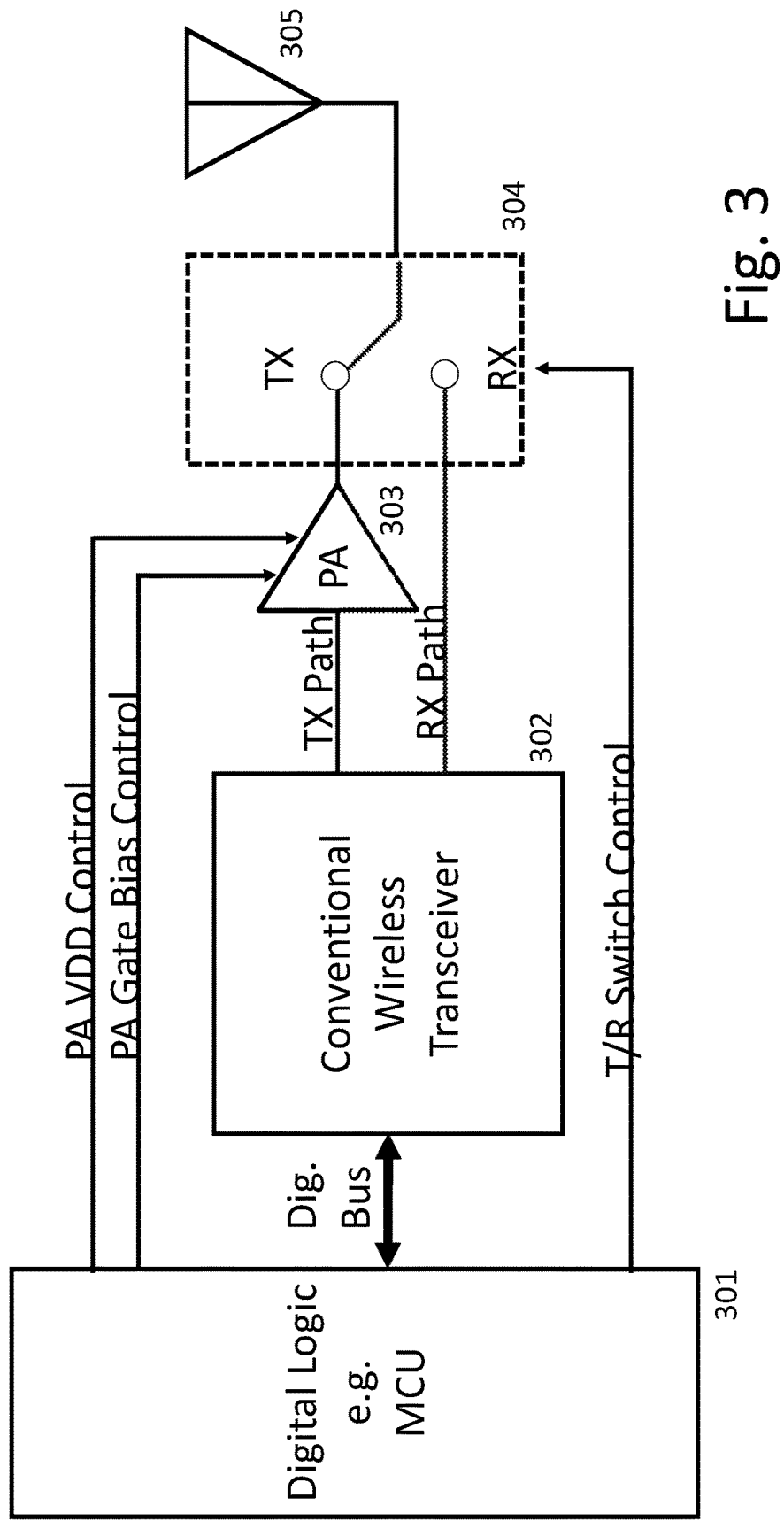
FIG. 3 is a schematic illustration of a radio frequency communication device capable of selectively operating in either backscatter or conventional non-backscatter modes arranged in accordance with examples described herein.

FIG. 3 shows a further alternative example wherein an optional transmit-receive switch 304 is included and is connected to antenna 305. In the transmit position of the transmit-receive switch 304, the aforementioned conventional (non-backscatter) or backscatter modes may be used to transmit data. In the receive position of the transmit-receive switch 304, the receiver in the conventional wireless transceiver 302 may receive signals coming into the system from the antenna 304 via a more direct path having lower attenuation than the approach described in FIG. 2.

Figure 4:
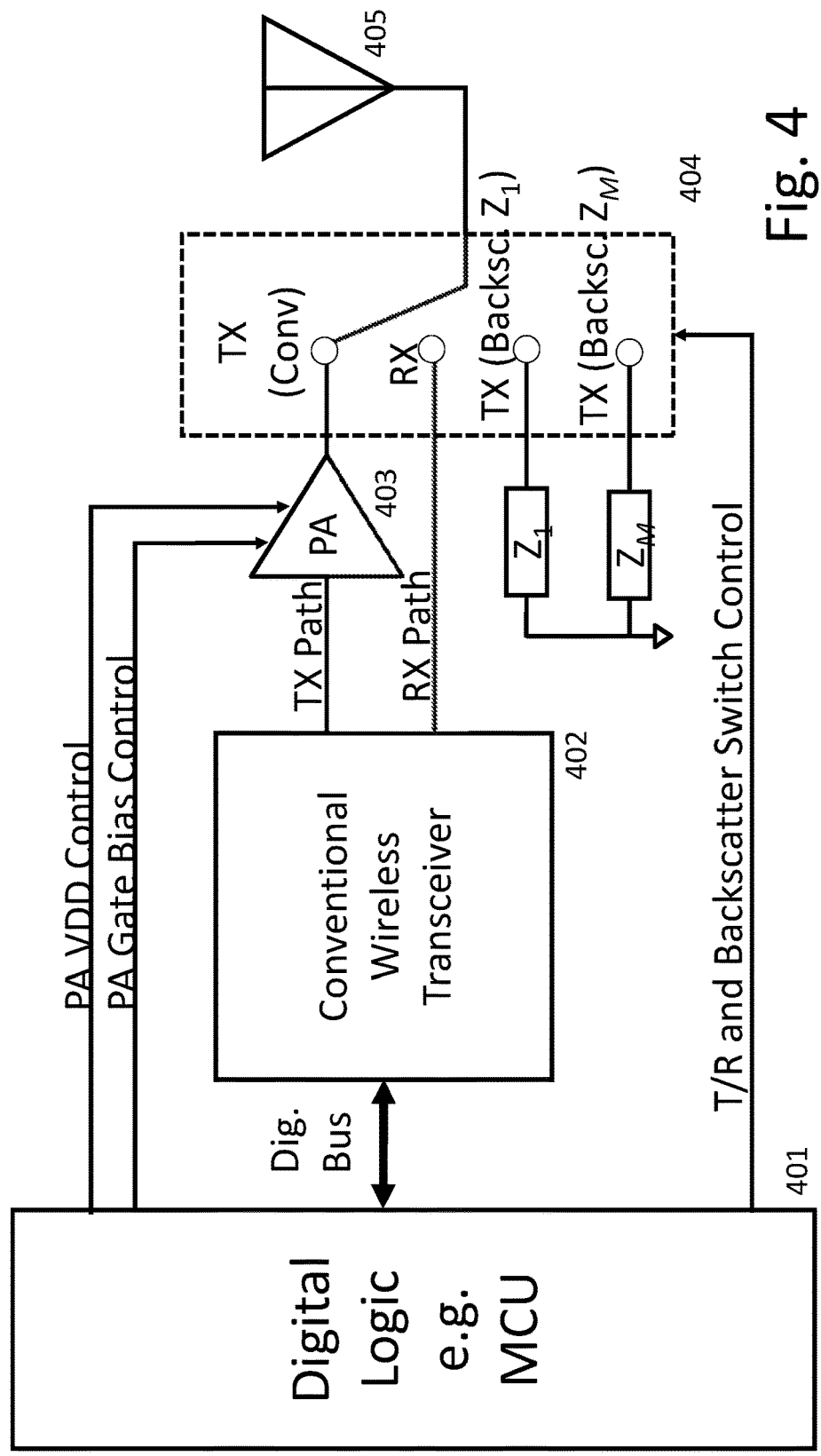
FIG. 4 is a schematic illustration of a radio frequency communication device capable of selectively operating in either backscatter or conventional non-backscatter modes arranged in accordance with examples described herein.

FIG. 4 shows a still further alternative example wherein an N-position RF switch 404 is used to switch the antenna 405 between at least 3 different positions: (1) a transmit path from power amplifier 403, (2) a receive path entering transceiver 402, and a number (1 . . . M) paths having different terminating impedances Z1 . . . ZM used to modulate the backscattered energy from the antenna 405. In such an example, any of the aforementioned modulation techniques may be used.

Figure 5:
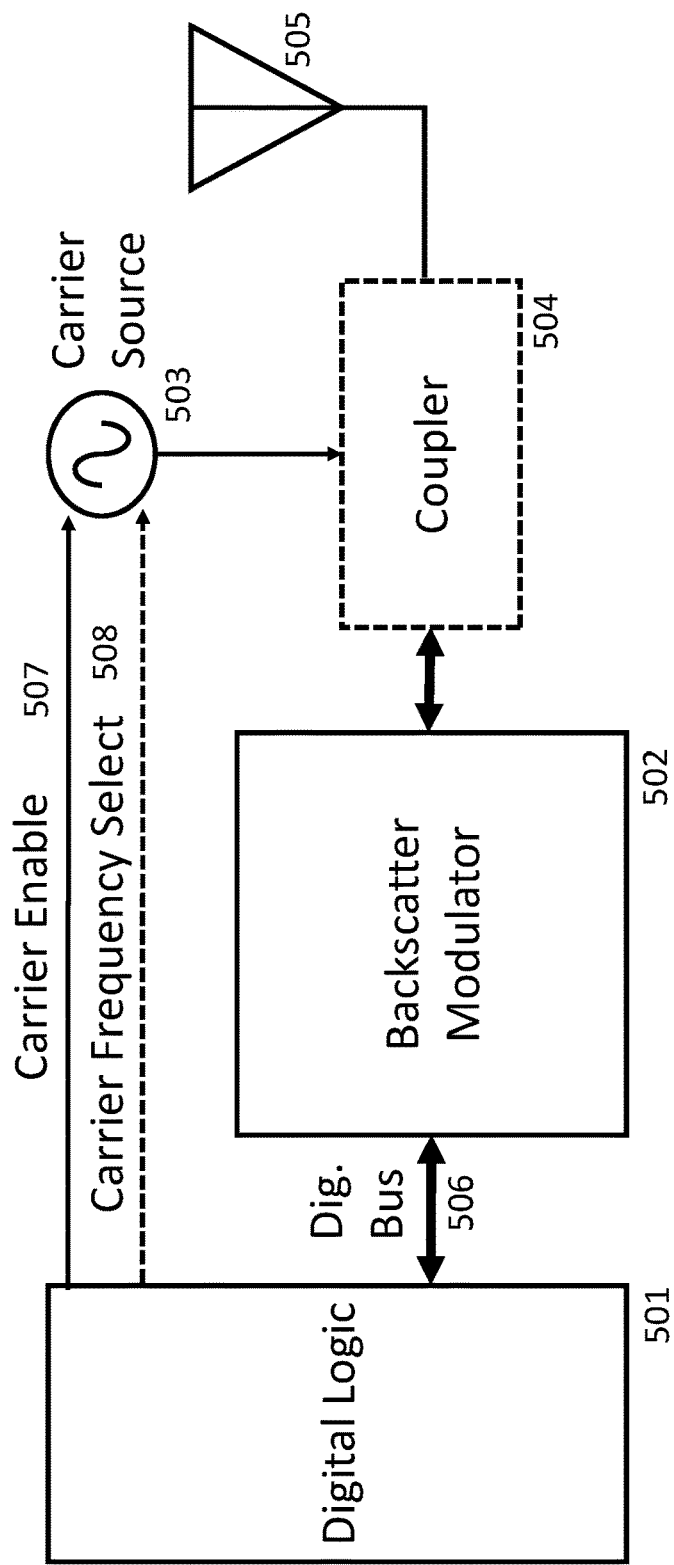
FIG. 5 is a schematic illustration of a radio frequency communication device capable of selectively operating in either backscatter or conventional non-backscatter modes arranged in accordance with examples described herein.

FIG. 5 shows a still further alternative example. In this example, there is no conventional transmitter chip, chipset, or discrete component configuration. Instead, a digital bus 506 from the digital logic 501 controls a backscatter modulator 502 having at least two impedance states. This modulator 502 is connected to the antenna 505 via an optional coupler 504 having a third input connected to a carrier source 503. Such a coupler 504 may comprise a directional coupler, a hybrid coupler, or a resistive or reactive coupling network. Carrier source 503 may comprise an oscillator or frequency synthesizer, which may or may have its own modulation.

In a backscatter mode, the carrier source 503 is disabled by a carrier enable signal 507, and the energy incident on the antenna 505 is coupled via the coupler 504 to the modulator 502, and is reflected from the modulator 502 back to the antenna 505 to form a backscattered signal.

In a conventional (non-backscatter) transmission mode, the carrier source 503 is enabled by control signal 507. An optional carrier frequency select signal 508 may be used to select the frequency of the carrier source 503. Further optional control signals may include control over the amplitude and/or phase of the carrier source 503.

Coupler 504 may split the carrier signal 503 into two or more portions according to a coupling fraction determined by the design of the coupler and the terminating impedances at each port. A first portion of the carrier signal from carrier source 503 is coupled via the coupler 504 into the backscatter modulator 502, and the reflected energy therefrom is coupled back through the coupler 504 into the antenna 505. A second portion of the carrier signal is coupled via the coupler 504 directly into the antenna 505. The signal at the antenna 505 port therefore consists of the sum of the modulated first portion and the unmodulated second portion. This combination therefore includes both carrier energy as well as modulation sidebands such as the upper sideband, lower sideband, or both upper and lower sidebands forming a double sideband signal. In some examples, the phases of the first portion and the second portion are controlled such that they at least partially cancel when summed at the antenna 505 port to reduce or eliminate the carrier at the antenna 505 port, leaving only the upper and/or lower modulation sideband(s). In further examples, the phases of the first portion and the second portion are controlled so as to suppress both the carrier and one of the upper and lower sidebands, to yield a single sideband signal.

In some examples, the coupler 504 may comprise a directional coupler. A directional coupler may be fabricated using a printed circuit on the same substrate as the rest of the radio frequency communication device (as in e.g. a pair of coupled microstrip transmission lines) or may alternatively be formed from a component directional coupler. In such examples, the "through" path of the coupler 504 may be disposed between the backscatter modulator 502 and the antenna 505. One end of the "coupled" path may be connected to the carrier source 503. The other end of the "coupled" path may be terminated in a terminating impedance. In such examples, the direction of the termination and the carrier source may be configured so as to at least partially cancel the carrier appearing at the antenna 505 port.

In some examples, the coupler 504 may comprise a transmission line segment, such as a microstrip transmission line segment, disposed between the backscatter modulator 502 and the antenna. The carrier source 503 may then be connected to the transmission line segment via a series element such as a resistor, a capacitor, or an inductor (or combinations thereof) such that the impedance presented by the combination of the series element plus the output impedance of the carrier source 503 may be substantially greater than that of the transmission line segment. In one example, the impedance of the transmission line segment and the antenna may be approximately 50 ohms. The output impedance of the carrier source 503 may also be approximately 50 ohms. A series element comprising a resistor of 1K ohms may be used to ensure that the carrier source 503 does not unduly affect the impedance of the transmission line segment.

In such examples, the carrier source 503 may be disabled for the radio frequency communication device to operate in a backscatter mode. To operate in a conventional (non-backscatter) transmit mode, the carrier source 503 may be enabled, and its frequency may be set by an optional control line or bus under the control of the digital logic 501. The backscatter modulator 502 is then operated to produce different reflection coefficients at the corresponding port of the coupler 504. The resulting impedance matching states at the coupler 504 yield upper and/or lower modulation sideband(s) at the antenna port, which are then transmitted by the system.

Figure 6:
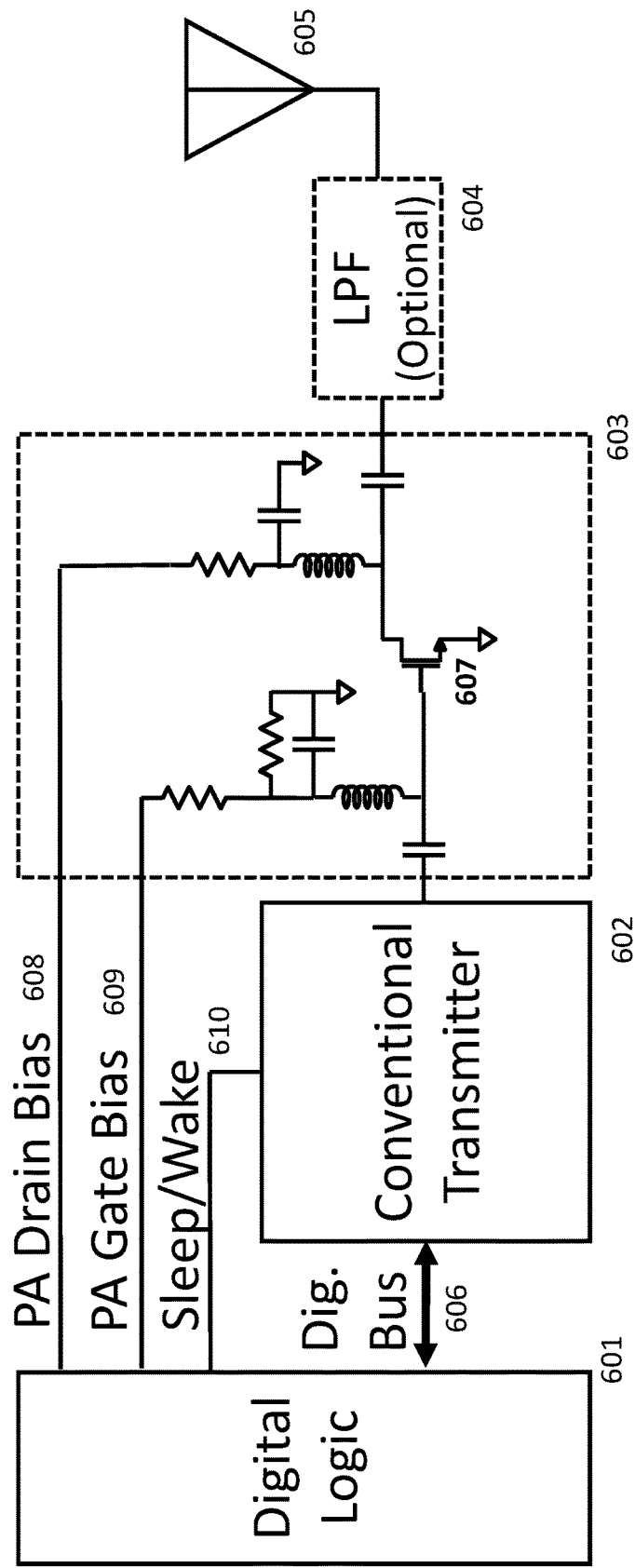
FIG. 6 is a schematic illustration of a radio frequency communication device capable of selectively operating in either backscatter or conventional non-backscatter modes arranged in accordance with examples described herein.

FIG. 6 shows an example where a radio frequency communication device such as a wireless sensor or mobile device selectively operates either in a high data rate (e.g. 10 Mbps) BPSK backscatter or a conventional e.g. 1 Mbps Bluetooth Low Energy (BLE) mode, re-using the same antenna and transmitter hardware in both modes. The radio frequency communication device may select either backscatter or conventional mode depending on the availability of an external carrier, the desired uplink rate, or the device's energy availability.

In one example, the conventional (non-backscatter) mode, a transmitter 602 generates a band-pass signal with a self-generated carrier, such as a 1 Mbps GFSK Bluetooth Low Energy (BLE) signal, which is amplified by a power amplifier 603 having a FET 607 operating as a Class-C amplifier. The Class-C amplifier may in some examples have a gain of 14 dB and 1 dB compression point (P1 dB) of +15.5 dBm at 2.450 GHz. In saturation, the PA may be capable of up to +17 dBm output with a power added efficiency (PAE) of around 78%. The power amplifier may be driven by a low-cost, low power Nordic Semiconductor nRF24L01+ transceiver chip forming transmitter 602 with a power output of 0 dBm. Using the BLE-specified 1 Mbps GFSK modulation, the PA's measured output power may be +14 dBm while the DC power consumed may be 44 mW, for a PA efficiency of 61%. In this example, given the 81 mW total DC power consumed by the PA and the nRF24L01+, and a 242 μs, 242 bit BLE advertising packet, the conventional-mode energy per bit is 81 nJ/bit.

In the backscatter mode, the transmitter 602 is kept in sleep mode via sleep/wake signal 610 and/or digital bus 606, the drain bias is removed from the FET 607 via the PA drain bias control signal 608, and backscatter signaling is accomplished by modulating the gate bias 609 at a rate limited only by the speed of the digital logic 601. In this mode, the FET 607 functions as a two-state impedance switch to produce two reflection coefficients, ΓA and ΓB, at the antenna 605 port, depending on whether the gate bias voltage 609 is zero volts or 3.3 V respectively. In some examples, the reflection coefficients at the antenna port may be ΓA=0.0083−j0.1579 and ΓB=−0.7040+j0.6343. The difference between these two reflection coefficients, ΔΓ=0.7123−j0.7922, determines the magnitude and phase of the backscattered signal. The power consumption in the backscatter mode is simply the energy required to charge and discharge the sum of the device gate capacitance and the impedance matching capacitances. In one example, the total capacitance is ≈12 pF so an energy of ½*C*V^2=65 pJ is expended to charge the gate. Thus, the energy per bit consumed by the backscatter modulator mode is ≈32.6 pJ/bit on average which is over 1000×lower energy per bit than the radio frequency communication device may consume in the conventional (non-backscatter) mode.

Figure 7:
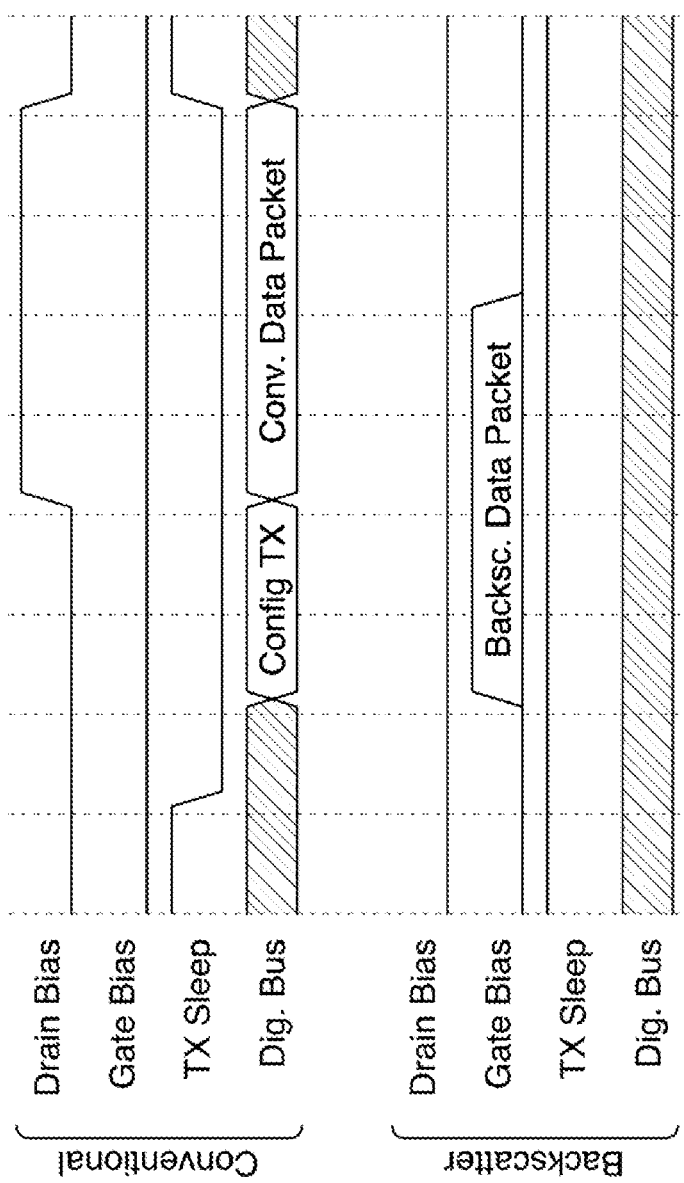
FIG. 7 is an illustration of a timing diagram showing the timing of control signals operable in both the backscatter and conventional (non-backscatter) communication modes for some examples.

FIG. 7 presents a digital logic timing diagram describing the operation of an example in which example timing of the various control signals previously described is shown for each of the conventional (non-backscatter) and backscatter communication modes. As shown in FIG. 7, the radio frequency communication device may time multiplex between backscatter and conventional (non-backscatter) communication modes via the control of the various control signals previously described. This approach facilitates the re-use of the same hardware in both modes.

From the foregoing it will be appreciated that, although specific examples have been described herein for purposes of illustration, various modifications may be made while remaining with the scope of the claimed technology. One of ordinary skill in the art will appreciate that the above examples are illustrative and non-limiting in nature. Other variations may be employed, including different types of components or combinations of components for implementing the same or similar functions as one or more of the circuit elements shown herein.

What is claimed is:

1. A radio frequency communication device, comprising:
   a backscatter transmitter circuit;
   a non-backscatter transceiver circuit;
   an antenna; and
   a transistor in a transmit path of the non-backscatter transceiver circuit and electrically coupled to the antenna, the transistor configured to, in a backscatter modulator mode, vary an impedance presented to the antenna via the transmit path of the non-backscatter transceiver circuit;
   wherein each of the backscatter transmitter circuit and the non-backscatter transmitter circuit are in electrical communication with the antenna.

2. The radio frequency communication device of claim 1, wherein a bias signal is applied to a control terminal of the transistor.

3. The radio frequency communication device of claim 2, wherein the transistor comprises a bipolar junction transistor and the control terminal comprises a base terminal.

4. The radio frequency communication device of claim 2, wherein the transistor comprises a field effect transistor and the control terminal comprises a gate terminal.

5. The radio frequency communication device of claim 2, wherein the bias signal comprises a baseband signal of a communication standard.

6. The radio frequency communication device of claim 5, wherein the communication standard comprises at least one of the Bluetooth, Wi-Fi, :IEEE 802.11, Zigbee, Z-Wave, or LoRa communication standards.

7. The radio frequency communication device of claim 1, wherein during a first time interval, the transistor modulates the impedance presented to the antenna, and during a second time interval, the transistor amplifies a signal produced by the non-backscatter transmitter circuit.

8. The radio frequency communication device of claim 7, wherein a drain voltage or a collector voltage of the first transistor is substantially zero during the first time interval.

9. The radio frequency communication device of claim 1, wherein the transistor is further configured to vary the impedance presented to the antenna, when the backscatter transmitter circuit receives a wake signal.

10. The radio frequency communication device of claim 1, wherein a dc drain bias voltage of the transistor is zero during the backscatter modulator mode.

11. The radio frequency communication device of claim 1, further comprising:
    a switch configured to switch between a transmit path of the non backscatter transceiver circuit and a receive path of the non-backscatter transceiver circuit.

12. The radio frequency communication device of claim 1, wherein the transistor is further configured to amplify, in a non-backscatter mode, a signal generated by the non-backscatter transceiver circuit.

13. The radio frequency communication device of claim 1, further comprising:

a radio frequency oscillator in electrical communication with a gate terminal of the transistor.

14. The radio frequency communication device of claim 13, wherein radio frequency communication device generates a backscatter signal during a first time interval, and a radio frequency transmission during a second time interval; and wherein the radio frequency oscillator is disabled during the first time interval and enabled during the second time interval.

15. The radio frequency communication device of claim 14, wherein the dc bias voltage is zero during the first time interval and is non-zero during the second time interval.

16. The radio frequency communication device of claim 13, wherein the radio frequency oscillator comprises a frequency synthesizer.

17. The radio frequency communication device of claim 1, wherein the transistor is further configured to, in the backscatter modulate mode, vary the impedance presented to the antenna by modulating a drain to source impedance of the transistor based on a sequence of symbols.

18. The radio frequency communication device of claim 17, wherein the sequence of symbols comprises a baseband signal having two or more voltage levels.

19. A method of transmitting a signal from a radio frequency communication device having an antenna, the method comprising:
determining a communication mode for the radio frequency communication device from among a plurality of modes including (a) a backscatter communication mode and (b) a non-backscatter communication mode; and
selecting a bias condition for a transistor based on the communication mode, wherein the transistor is in electrical communication with the first antenna, and wherein the transistor operates as an impedance modulator when the radio frequency communication device is in the backscatter communication mode and as an amplifier when the radio frequency communication device is in the non-backscatter communication mode, wherein selecting the bias condition for the transistor further based on a received signal sleep/wake line, wherein a sleep signal of the sleep/wake line indicates that the transistor operates as the impedance modulator, and wherein a wake signal of the sleep/wake line indicates that the transistor operates as the amplifier.

\* \* \* \* \*